United States Patent [19]
Rose

[11] 3,764,880
[45] Oct. 9, 1973

[54] TWO-WIRE CURRENT TRANSMITTER WITH ISOLATED TRANSDUCER CIRCUIT

[75] Inventor: Robert C. Rose, Minneapolis, Minn.
[73] Assignee: Rosemount Inc., Eden Prairie, Minn.
[22] Filed: May 8, 1972
[21] Appl. No.: 250,882

[52] U.S. Cl. .................. 321/2, 73/362 AR, 321/16, 323/75 N
[51] Int. Cl. ............................................. G01k 7/02
[58] Field of Search ...................... 73/359, 362 AR; 321/2, 16; 323/75 N

[56] References Cited
UNITED STATES PATENTS

| | | |
|---|---|---|
| 3,503,261 | 3/1970 | Riester et al..................... 323/75 N |
| 3,517,556 | 6/1970 | Barker.............................. 323/75 N |
| 3,538,355 | 11/1970 | Grindheim et al................ 73/359 X |
| 3,581,184 | 5/1971 | Hurd...................................... 321/2 |

*Primary Examiner*—A. D. Pellinen
*Attorney*—Ralph L. Dugger et al.

[57] ABSTRACT

A two-wire current transmitter for controlling total current in the two wires in accordance with a sensor value and which provides for isolation of the transducer circuitry from the load and power source through a single transformer.

14 Claims, 2 Drawing Figures

TWO-WIRE CURRENT TRANSMITTER WITH ISOLATED TRANSDUCER CIRCUIT

BACKGROUND OF THE INVENTION

1. Field of the Invention

This invention relates to a two-wire current transmitter where a DC source level is controlled by the transmitter to correspond to the magnitude of a DC isolated sensing element which typically is a thermocouple.

2. Description of the Prior Art

A prior art transmitter is described in my U.S. Pat. No. 3,573,599 Issued Apr. 6, 1971 where transformer coupling is used to DC isolate a sensing circuit from a supply circuit in a two-wire current transmitter. The sensing circuit includes an AC amplifier whose input repetitively samples and compares the signals from a DC sensor network and from a DC feedback network which is transformer coupled to the supply circuit. A DC amplifier on the supply side acts as a current controller for the supply circuit. Multiple AC coupling means are required between the sensing circuit and the supply circuit.

SUMMARY OF THE INVENTION

The present invention provides DC isolation between a transducer circuit and a power source circuit in a two-wire transmitter using a single transformer. The transducer circuit comprises a sensor network and a feedback resistance which provides a signal to the input of a DC amplifier. The DC amplifier has a current controller connected to its output and the controller current flows through the feedback resistance which is series connected with the DC output side of a DC/DC converter. The source circuit is connected to the input side of the converter and comprises a voltage regulator which provides a regulated voltage to the converter from a power supply circuit over the current range of the transmitter which may be 4–20 ma for example. The voltage regulator requires only a small, substantially constant operating current to provide required operating voltage regulation to the converter circuit.

DESCRIPTION OF THE PREFERRED EMBODIMENT

Figure 1:
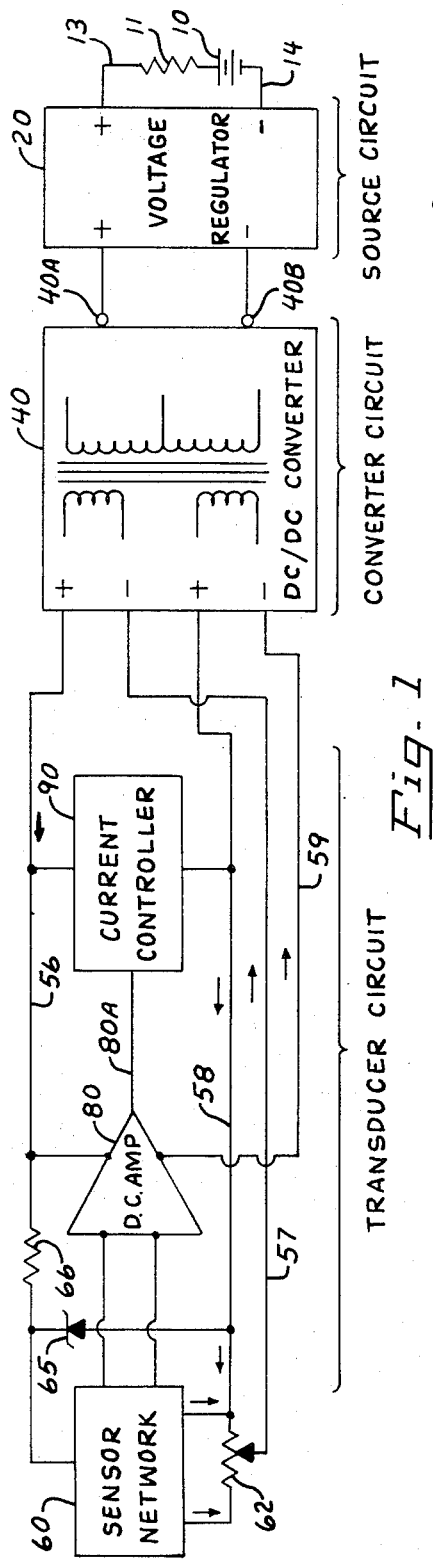
FIG. 1 is a schematic showing the transmitter of the present invention in block form.

Referring to FIG. 1, a DC power supply 10 and series load resistance 11 both of which may be remotely located, are series connected to a voltage regulator circuit 20 by lines 13 and 14. Load resistance 11 may comprise an actuator, a controller, a recorder or simply a current indicating instrument. The voltage regulator 20 together with the power supply 10 and load 11 is referred to as a "source" circuit. Voltage regulator 20 includes a current supply circuit which provides current at a regulated DC voltage level to a DC/DC converter 40 through input terminals 40A and 40B. Converter 40 comprises a single transformer together with appropriate switching transistors on the input and demodulators on the output to provide DC output voltages to a transducer circuit. The transducer circuit comprises a sensor network 60 which may be a resistance bridge providing an output voltage as a function of the resistance of one or more bridge arms, for example. A feedback resistance 62 is series connected with the output of the converter circuit and also is connected into the sensor network 60. A Zener diode 65 is connected to output lines 56 and 58 of the converter 40 across the inputs of the sensor network 60 and provides a reference voltage to the sensor network. The output terminals from sensor network 60 are connected to the input terminals of a differential input DC amplifier 80. Amplifier 80 is energized from the output of converter 40 along lines 56 and 59. A current controller circuit 90 is effectively a variable impedance connected across the output lines 56 and 58 of converter 40 and connected in series with feedback resistance 62. The current controller is controlled by the output signal from amplifier 80 which is carried by a line 80A.

In operation, a regulated voltage signal is provided by regulator 20 to the inputs of converter 40 and the converter provides a DC voltage to the transducer circuit. A change in the condition being measured by the sensor, which may be temperature, causes a change in a signal in the sensor network, for example a voltage or resistance change. This results in a change in the signal at the output of the sensor network. The transducer circuit responds to a change in signal at the output of the sensor network 60 by adjusting the current flowing through current controller 90 and hence through feedback resistance 62. Since the adjusted current of the transducer flows through the feedback resistance this current is a function of the change of the condition being measured. Primary current flow directions in the transducer circuit are shown by arrows in FIG. 1. The current on the input side of the converter (between the voltage regulator and the converter) has a precisely known relation to the current on the output side of the converter which flows in the transducer circuit. The current at the input of the voltage regulator and thus the current flowing through load resistor 11 in the input circuit for the voltage regulator is precisely related to the output current thereof and therefore the current in load 11 accurately changes in response to a change in the condition being measured.

Figure 2:
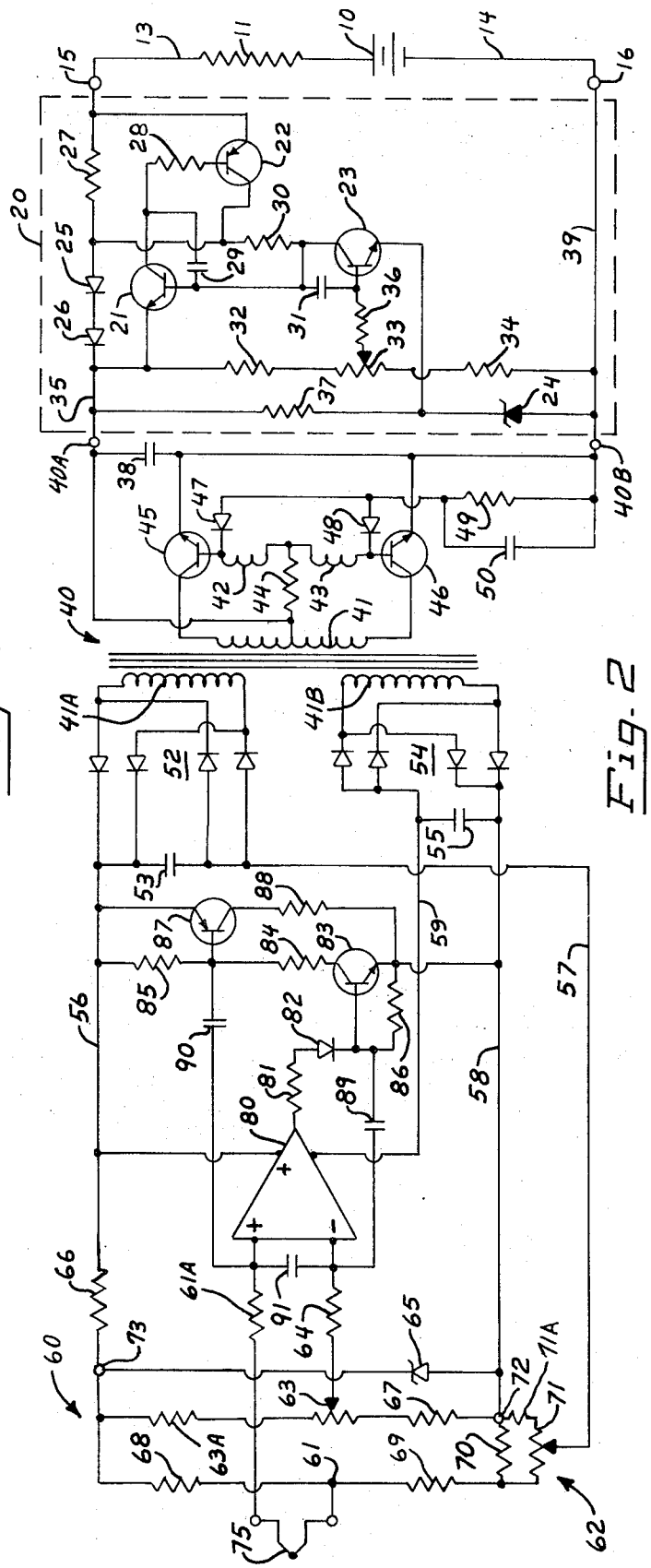
FIG. 2 is a detailed electrical schematic of a form of the transmitter of FIG. 1 employing a thermocouple sensor in the sensor network.

FIG. 2 shows a detailed transmitter circuit having a thermocouple 75 as a sensing element to measure temperature and providing a measurable current through load resistance 11, which varies as a function of the temperature at thermocouple 75. The series circuit comprising load resistance 11 and DC power supply 10 is connected to a pair of terminals 15, 16 by lines 13 and 14. The load resistance 11 and supply 10 may be remotely located relative to the remainder of the transmitter and connected to the rest of the transmitter only by lines 13 and 14. Load resistance 11 may comprise a recorder, control element or an indicator, for example. Also, if desired the voltage regulator may be a separate remote unit connected to the rest of the transmitter at terminals 40A and 40B.

Voltage regulator 20 comprises a series control transistor 22, a current amplifier transistor 21 and a voltage control transistor 23. A Zener diode 24 in series with resistor 37 is connected across lines 35 and 39 to provide a precise voltage reference. Diodes 25, 26 connected between the collector of transistor 22 and emitter of transistor 21 pass the bulk of the current supplied by transistor 22 and provide a substantially fixed supply voltage for transistor 23. The emitter of transistor 22 is connected to transmitter terminal 15. A resistor 27, which provides a small turn-on current for transistor 21, is connected between the emitter and collector of transistor 22. The collector of transistor 21 is connected through a current limiting resistor 28 to the base of transistor 22. A capacitor 29 is connected between the base and collector of transistor 21 for dynamic stabilization. A load resistor 30 is connected between the collectors of transistors 22 and 23, and the base of transistor 21 is connected directly to the collector of transistor 23. A capacitor 31 is connected between the base and collector of transistor 23 to provide dynamic stabilization.

A divider network comprising a series connected resistor 32, potentiometer 33, and resistor 34 is connected between the emitter of transistor 21, which also forms the output line 35 of the voltage regulator, and a line 39 which is a return line of the unit and is also connected to terminal 16. The lines 35 and 39 are connected to terminals 40A and 40B of the converter 40. The wiper arm of potentiometer 33 is connected through a resistor 36 to the base of transistor 23 and provides adjustability of the voltage on line 35. A current limiting resistor 37 is series connected between line 35 and the cathode of Zener diode 24. The cathode of diode 24 is connected to the emitter of transistor 23. A capacitor 38 is connected between line 35 and line 39 to provide filtering. In operation the voltage on line 35 is maintained constant under varying current demand conditions through the action of control transistor 23 and Zener diode 24. Any tendency for a voltage change on line 35 causes a voltage change at the base of transistor 23 which then provides a control signal of the proper polarity to the base of transistor 21 and from the collector of transistor 21 to the base of transistor 22 to reduce the voltage change or error on line 35 toward zero. The energizing current drawn by the voltage regulator through Zener diode 24 and resistor 34 is of low magnitude and is substantially constant over a wide range of regulator output current.

The DC/DC converter 40 comprises a low loss, tape wound core toroid transformer having a primary winding 41 with a center tap connected to line 35 through terminal 40A. This type of transformer has been found to provide especially good performance in this circuit. Feedback windings 42 and 43 are connected to the center tap of winding 41 through a resistor 44. The opposite ends of windings 42 and 43 are connected to the bases of switching transistors 45 and 46 respectively. The collectors of transistors 45 and 46 are connected to the opposite ends of winding 41 respectively and the emitters of both transistors connect to line 39 through terminal 40B. A pair of diodes 47 and 48 have their cathodes connected to the bases of transistors 45 and 46 respectively and their anodes are connected together and to one end of a resistor 49. The other end of resistor 49 connects to line 39 through terminal 40B. Resistor 49 may be selected to be temperature sensitive to provide both a current limiting function and temperature compensation for the switching transistors 45 and 46. A capacitor 50 is connected across resistor 49 and provides transient voltage peak suppression. The input circuit of the transformer oscillates in a manner dependant upon the saturation characteristics of the core and the frequency of oscillation is dependant upon the core inductance and the voltage between lines 35 and 39. The switching transistors provide a pulsing direct current flow in the winding 41, which provides current flow in the output windings 41A and 41B of the transformer. The impedance of the transformer determines the current flowing in the source circuit and the transformer impedance varies with the current in the secondary windings.

The transformer secondary or output circuit has two output windings each having a separate demodulator circuit 52 and 54 respectively. The demodulator circuits each comprise a full wave diode bridge connected across a separate secondary winding. The positive output terminal of bridge 52 is connected to line 56 and the negative output terminal is connected to line 57. The positive output terminal from bridge 54 is connected to line 58 and the negative output terminal is connected to line 59. Capacitors 53 and 55 connect across the output terminals of bridges 52 and 54 respectively and add filtering or smoothing of the DC output voltages.

Sensor network 60 comprises a resistance bridge having a thermocouple 75 connected at one end to a bridge output terminal 61 and connected at the other end through a resistor 61A to one signal input terminal of a differential input amplifier 80. The other bridge output terminal comprises the wiper arm tap of a potentiometer 63, which connects through a resistor 64 to the other signal input terminal of amplifier 80. Potentiometer 63 is in one branch of the bridge comprising two series connected arms and is connected to an upper bridge arm 63A at one end and to a lower bridge arm 67 at the other end. The potentiometer resistance is effectively divided to provide part of its resistance in the upper arm and part of its resistance in the lower arm. A parallel branch of the bridge has an upper arm comprising a resistor 68 connected at one end to terminal 73 and at the other end to terminal 61. The lower bridge arm comprises a resistor 69 connected at one end to terminal 61 and at the other end to the parallel combination of a resistor 70 and a potentiometer 71 which is connected through resistor 71A to a terminal 72. Resistor 67 is connected between input terminal 72 and potentiometer 63. The anode of Zener diode 65 is connected to terminal 72 and the cathode of diode 65 is connected to a terminal 73 and to the junction of resistors 63A and 68. Resistor 66 is connected at one end to terminal 73 and at the other end to line 56. Line 58 is connected to terminal 72 and the wiper arm of potentiometer 71 is connected to line 57. Resistor 70, resistor 71A and potentiometer 71 together comprise the feedback resistance 62. Bridge resistor 69 is selected to have a positive temperature coefficient so that it provides cold junction compensation for thermocouple 75, which is typically located remote from the bridge. The feedback resistance 62 is connected between diode bridges 52 and 54 in such a manner that substantially all the current delivered by the diode bridges 52 and 54 passes through the feedback resistance 62. In operation, the wiper arm of potentiometer 71 is always at a position so that the wiper arm does not connect directly to terminal 72. Resistor 71A is connected between terminal 72 and potentiometer 71 and the resistor 71A prevents the wiper arm of potentiometer 71 from direct connection to terminal 72. Potentiometer 71 provides a sensitivity control in conjunction with resistor 70.

Amplifier 80 is energized by being connected between lines 56 and 59 and has its output connected through a current limiting resistor 81, thence through a diode 82 to the base of a transistor 83. The emitter of transistor 83 is connected to line 58 and the collector is connected through a resistor 84, thence through a resistor 85 to line 56. A resistor 86 is connected between the base and emitter of transistor 83 and acts as a current leakage suppression resistor. The base of a transistor 87 is connected to the junction between resistors 84 and 85. The emitter of transistor 87 is connected to line 56 and the collector of transistor 87 connects through a resistor 88 to the emitter of transistor 83. Transistors 83 and 87 act as a cascade amplifier for current control responsive to a changed output from sensor network 60 which changes the output of amplifier 80. Dynamic stabilization is achieved by a capacitor 89 connected between the base of transistor 83 and the inverting input of amplifier 80 and by a capacitor 90 connected between the base of transistor 87 and the non-inverting input of amplifier 80. Another capacitor 91 is connected across the input terminals of amplifier 80 and capacitor 91 together with resistors 61A and 64 are noise suppression elements.

Operational amplifiers function more satisfactorily when the positive supply is substantially higher in potential and the negative supply is substantially lower in potential relative to the signal inputs to the amplifier. The use of two secondary windings as shown in converter 40 permits exciting the bridge at a voltage that is less than the voltage at the power terminals of the amplifier 80 and provides bridge signals to the amplifier at a desired potential level relative to the amplifier power supply. Note that the voltage across the bridge is the voltage drop between terminal 73 and line 58 while the amplifier power terminals are connected across lines 56 and 59.

Zener diode 65 provides a constant voltage for excitation of the resistance bridge in the sensor network and potentiometer 63 is a zero adjust for the output of this bridge. A change in temperature sensed by thermocouple 75 provides a signal to the non-inverting terminal of amplifier 80. This unbalance results in a changed signal output from the amplifier and thus a changed current flow through transistors 83 and 87. This current change is sensed by feedback resistance 62 and this provides a voltage change at terminal 61 which opposes the thermocouple signal. The magnitude of the current change is just sufficient to always change the voltage at the non-inverting terminal of amplifier 80 to substantially equal the voltage at the inverting signal input terminal to stabilize the current output at a new level so that the current through feedback resistance 62 is precisely related to the temperature sensed by thermocouple 75. Since resistor 69 is temperature responsive, an increase in its resistance due to a temperature change also is balanced by a changed current flow through feedback resistance 62 and thus the total current is a function of the temperature at resistor 69 and the temperature sensed by thermocouple 75. If desired, resistor 69 could be used as a resistance thermometer to measure temperature at a remote location in which case terminal 61 would be connected directly to resistor 61A and thermocouple 75 would be eliminated. As shown, resistor 69 acts as a cold junction compensation for thermocouple 75 in a conventional manner.

The change in current in the output circuits of converter 40 causes a change in the impedance of the transformer. The input circuit for the transformer provides the change in drive power when the output circuit current changes. Because the voltage applied to the input circuit of converter 40 is held constant by voltage regulator 20 the current flowing through the voltage regulator therefore changes in accordance with the current changes through feedback resistance 62. The current change in line 35 to the transformer primary winding 41 and thence to line 39 is therefore directly proportional to the current change through the feedback resistance 62. The only other currents flowing from terminal 15 to terminal 16 are the operational or excitation current required by the voltage regulator 20, and a transformer primary and switching transistor excitation current. These currents are relatively small and remain at a stable level throughout the normal operating range of the unit. This excitation current may be offset or supplemented by the zero adjustment afforded by the transducer bridge potentiometer 63.

A typical application of this circuit is to provide a current output proportional to temperature where a current level delivered through load 11 of 4 milliamperes corresponds to the lowest temperature being measured and a current of 20 milliamperes corresponds to the highest temperature to be measures. The "zero" setting of 4ma is set by means of potentiometer 63 and the range is adjusted by means of span potentiometer 71.

While temperature sensing circuits specifically have been described it should be clear that other conditions can also be measured with the described circuitry. An example of another condition is measurement of pressure by means of transducers providing a resistance change or an electrical output.

The entire current control circuitry responsive to the sensor network is isolated from the power source through the DC/DC converter 40. There is no need for any AC amplifier on the isolated side of the circuit nor is there a need for current control circuitry on the power supply side of the circuit. The circuitry is therefore greatly simplified while still providing an isolated transducer.

What is claimed is:

1. A two-wire current transmitter for connecting to a source of substantially constant DC voltage including a transducer circuit, DC/DC converter means connected between the source and the transducer circuit and providing a DC output to said transducer circuit, said transducer circuit including a sensor circuit which provides a DC signal which varies as a function of a condition being measured, a current controller providing control of current in the transducer circuit responsive to the sensor circuit DC signal, and a feedback resistance in series with the current controller and connected to the sensor circuit to provide a feedback signal in opposition to the DC signal to achieve a balance in said current controller so that the transducer current varies as a function of the condition being measured, said source providing power for the change in current in the transducer circuit through said converter means at said substantially constant DC voltage whereby the source current varies as a function of the condition being measured.

2. The combination as specified in claim 1 wherein said DC/DC converter means comprises a single transformer having input and output windings DC isolated from each other.

3. The combination as specified in claim 2 wherein the input circuit to said transformer includes switching means to provide polarity reversing currents in the primary winding of said transformer.

4. The combination specified in claim 2 wherein said transformer is a tape wound core toroid transformer.

5. The combination specified in claim 1 wherein said current controller comprises a differential input amplifier, and said sensor circuit includes a resistance bridge, said feedback resistance being connected into said bridge and causing a balancing of signals at the inputs of said amplifier.

6. The combination of claim 5 wherein said DC/DC converter means comprises a transformer having a pair of secondary windings, the secondary windings providing excitation voltage for said amplifier and for said bridge, the excitation voltages across said bridge being less than the excitation voltages for said amplifier.

7. A two-wire current transmitter for connection on two wires to a DC supply and load comprising a voltage regulator circuit energized by the two wires and providing a substantially constant DC voltage output, a transducer circuit, an electrical energy converter means having its input connected to the output of the voltage regulator and its output connected to the transducer circuit, said converter means having its output DC isolated from its input, said transducer circuit including a sensor circuit providing a DC signal which varies as a function of a condition being measured and further including a current controller providing a control of current in said transducer circuit responsive to the DC signal from said sensor circuit, a feedback resistance in series with the current controller, means connecting said feedback resistance to the sensor network, current changes responsive to said DC signal causing a feedback signal in said feedback resistor opposing said DC signal in a manner to stabilize the current output of the current controller so that the transducer circuit current varies as a function of the condition being measured, said transducer circuit being powered only through said voltage regulator and said converter so that the current flowing in said voltage regulator also varies as a function of the condition being measured.

8. The combination as specified in claim 7 wherein said electrical energy converter means comprises a single transformer having input and output windings DC isolated from each other to prevent the transmission of direct currents therebetween.

9. The combination as specified in claim 8 wherein said transformer is a tape wound core toroid transformer.

10. A two-wire current transmitter for connection to a power source of substantially constant DC voltage, comprising a converter circuit having a DC input and a DC output and including a transformer providing DC isolation between a primary circuit and a secondary circuit of the converter, said primary circuit including switching means for connection to the source to provide alternating current to the transformer, said secondary circuit including rectification means to provide a secondary direct current output, means to maintain the direct current in the primary circuit proportional to the secondary direct current, a transducer circuit energized by said secondary direct current, said transducer circuit including a sensor network providing a first electrical signal which varies as a function of a condition being measured, a DC amplifier having an input connected to the sensor network, a current controller having its input connected to the output of the DC amplifier and including means providing control of the magnitude of the secondary direct current, and a feedback resistance in series with the current controller, and said feedback resistor being connected into the sensor network to provide a second electrical signal in opposition to the first electrical signal to achieve a balance in the output of the current controller so that the secondary direct current varies as a function of the condition being measured.

11. A two-wire current transmitter for connection to a source of power maintained at substantially constant DC voltage whereby changes in power therefrom result in changes in current flow in said source, including a transducer circuit, electrical converter means connected to the source on said two wires and providing a DC output to said transducer and being the power source for said transducer circuit, said transducer circuit including a control circuit and a current controller means to regulate current flow in said transducer circuit responsive to signals from said control circuit, said converter including means to change power required from said source as a function of current changes in said transducer circuit, a feedback resistance connected to the current controller output, and means connecting said feedback resistance to the current controller to provide a feedback signal in opposition to the signal from the control circuit to achieve balance in said current controller so that the transducer current varies as a function of the signals from the control circuit, said source providing power required for the change in current in the transducer circuit through said converter means at said substantially constant DC voltage whereby the current in said source is proportional to the control circuit signal.

12. The combination as specified in claim 11 wherein said converter comprises a single transformer having an input winding and an output, switching means to provide pulsating DC current from said source to said input winding, and rectifier means on the output of said transformer to provide DC power to the transducer circuit.

13. The transmitter of claim 11 further characterized in that said control circuit comprises a sensor responsive to a condition being measured so that said control signal changes as a function of the sensor value.

14. The transmitter of claim 11 wherein said current controller includes a differential input amplifier having an output connected to current control elements, said differential inputs to said amplifier sensing changes in the control signal and said feedback signal to control current as a function of said signals.

* * * * *